United States Patent [19]

Orlarey

[11] Patent Number: 4,527,439

[45] Date of Patent: Jul. 9, 1985

[54] GYROSCOPE ERECTION SYSTEM

[75] Inventor: Maurice M. Orlarey, Charlevoix, Mich.

[73] Assignee: Allied Corporation, Morris Township, N.J.

[21] Appl. No.: 423,989

[22] Filed: Sep. 27, 1982

[51] Int. Cl.³ .............................................. G01C 19/30
[52] U.S. Cl. ......................................... 74/5.43; 74/5.8
[58] Field of Search ...................... 74/5.43, 5.42, 5.44, 74/5.8

[56] References Cited

U.S. PATENT DOCUMENTS

| | | | |
|---|---|---|---|
| 2,133,489 | 10/1938 | Smith | 74/5.43 |
| 2,326,784 | 8/1943 | Lane | 74/5.43 |
| 2,409,188 | 10/1946 | Braddon et al. | 74/5.43 |
| 2,780,104 | 2/1957 | Carlson et al. | 74/5.43 |
| 3,093,004 | 6/1963 | Summers | 74/5.43 |
| 3,272,019 | 9/1966 | Barnes | 74/5.43 |
| 3,498,145 | 3/1970 | Clark | 74/5.43 |
| 3,499,335 | 3/1970 | Korzeniauskas | 74/5.43 |
| 3,606,794 | 9/1971 | Culver | 74/5.43 |
| 3,612,443 | 10/1971 | Stripling | 74/5.43 X |
| 4,088,031 | 5/1978 | Sholes | 74/5.43 |

*Primary Examiner*—Rodney H. Bonck
*Attorney, Agent, or Firm*—Anthony F. Cuoco

[57] ABSTRACT

An erection system (22) which is responsive to the flow of air for erecting a gyroscope (1) is diclosed. The erection system includes a plurality of channels (26,28,30,32) having balls (42) disposed therein. The balls (42) are responsive to the gyroscope (1) being tilted from an erect attitude by a first relatively small predetermined angle (0.5°) for rolling in the channels (20,28,30,32) to create an unbalanced flow of air through the erection system (22), which provides a force to erect the gyro (1), and are responsive to the gyroscope (1) being tilted by a second relatively large predetermined angle (10°) for rolling in the channels (26,28,30,32) to negate the unbalanced air flow which disables the erection system (22).

5 Claims, 7 Drawing Figures

GYROSCOPE ERECTION SYSTEM

BACKGROUND OF THE INVENTION

Some gyroscopes (gyros) require erection systems which slave an axis of the gyro ("erect" the gyro) to a desired attitude. For a vertical gyroscope, for example, the gyro rotor spin axis is slaved to the vertical.

Various types of erection systems have been used for this purpose. Some erection systems are electromagnetic and use a gravity switch and an electromagnetic torquer. Other erection systems are electromagnetic and use a pendulous pickoff element for controlling a torquing element, while yet other systems use an electrolytic switch wherein the variable resistance of an electrolytic fluid controls the torquing element. Still other erection systems are mechanical such as the "ball disc" erection system or the "pin ball" erection system and feature variations to disconnect or disable the erection system to avoid false slaving during maneuvers of a vehicle, such as an aircraft, using the gyro for navigational purposes.

Some erection systems employ the flow of air produced by the spinning gyro rotor to generate reaction forces. These forces are gravity controlled by vane like devices to direct appropriate air jets which erect the gyro. However, these systems are not capable of being disconnected under excessive turn or acceleration conditions of the vehicle, as are likely to occur.

SUMMARY OF THE INVENTION

This invention contemplates an air and ball type erection system for a gyro, including a lease and plurality of channels, formed therein each of which extends in a different direction. Balls are arranged in each of the channels so as to roll therealong. A fan or turbine like device spins with the gyro rotor to direct an air stream through the erection system. As long as the gyro is erect, the balls are stationary in their channels, permitting a balanced flow of air through the erection system so that no torque is applied to the gyro. If the gyro is tilted from its erect attitude in a particular direction as by a turn of the vehicle, by more than a first relatively small predetermined angle but less than a second relatively large predetermined angle, a ball will roll in its channel for blocking the flow of air through that channel. An unbalanced flow of air through the erection system is thereby created which provides a torque for erecting the gyro. If the gyro is tilted by more than the second predetermined angle another of the balls will roll in its channel for blocking the flow of air through that channel, whereupon the unbalanced air flow is negated and the erection system is disabled. Under acceleration conditions, similar effects will occur. This is to say, under slight accelerations, the air flow through the erection system is unbalanced to torque the gyro, and under heavier accelerations the air flow unbalance is negated to disable the erection system.

Accordingly, it is an object of this invention to provide an air and ball type gyro erection system which erects the gyro when the gyro is tilted by a first relatively small predetermined angle, and which is disabled when the gyro is tilted by a second relatively large predetermined angle.

DETAILED DESCRIPTION OF THE INVENTION

For purposes of illustration, the erection system of the invention will be described with reference to a vertical gyro wherein it is desired to slave the spin axis of the gyro rotor to the vertical. It will be understood, however, that the erection system may be used with any type of gyro (such as a directional gyro) to slave an axis of the desired attitude.

Figure 1:
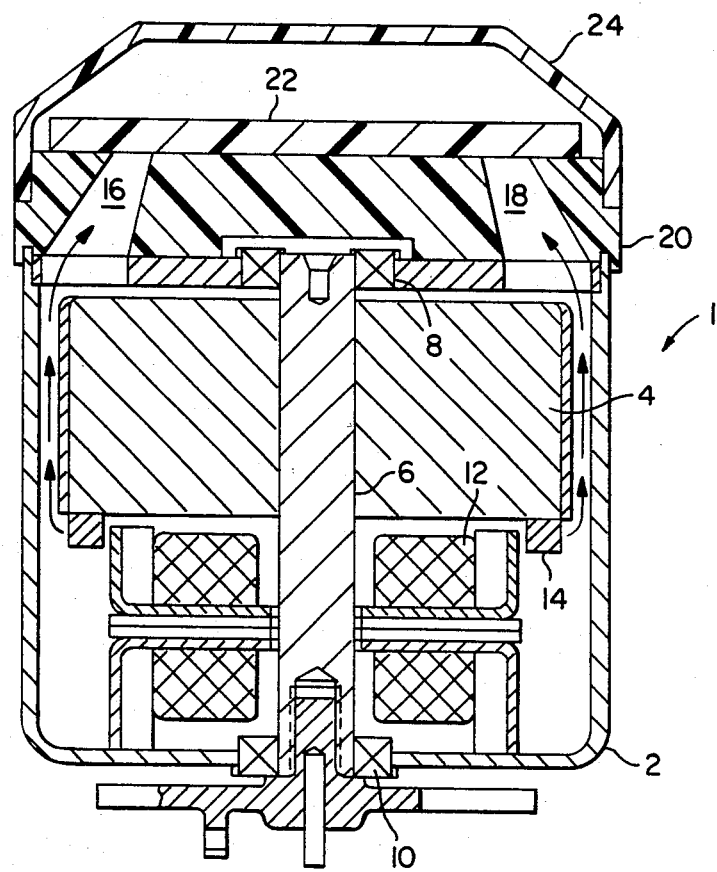
FIG. 1 is a sectioned diagrammatic plan view of a gyro inner gimbal and an erection system according to the invention arranged therewith.

With reference first to FIG. 1, there is shown an inner gimbal of a vertical gyro designated generally by the numeral 1, and having a case 2 and a rotor 4 rotatably mounted therein through a shaft 6 journaled in the case by bearings 8 and 10.

A motor 12 is suitably coupled to shaft 6 for rotating the shaft and thereby rotating rotor 4. A fan or turbine like device 14 is secured to rotor 4 so as to rotate therewith and to thereby direct an air stream through air inlet ports 16 and 18 in erection system base 20 as shown by the arrows in FIG. 1.

Base 20 supports an erection system 22 which is responsive to the air stream for maintaining the spin axis of rotor 4 vertical as will hereinafter be more fully described. A cover 24 is arranged to fit over base 20 and to thereby maintain the balls of erection system 22 within their respective channels, as will also hereinafter be more fully described.

Only as much of gyro inner gimbal 1 has been shown and described as is necessary for describing the erection system of the invention, as the same will be understood by those skilled in the art.

Figure 2:
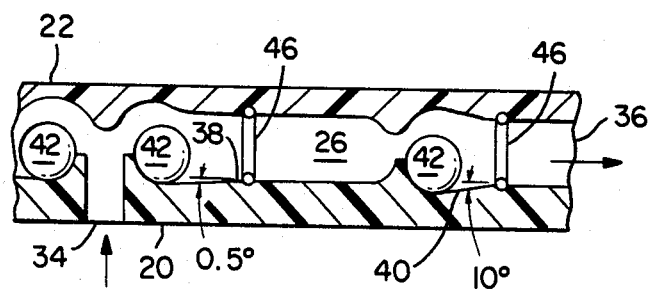
FIG. 2 is a sectioned diagrammatic view of a typical erection system channel, with the balls shown disposed in said channel when the gyro is erect.
Figure 3:
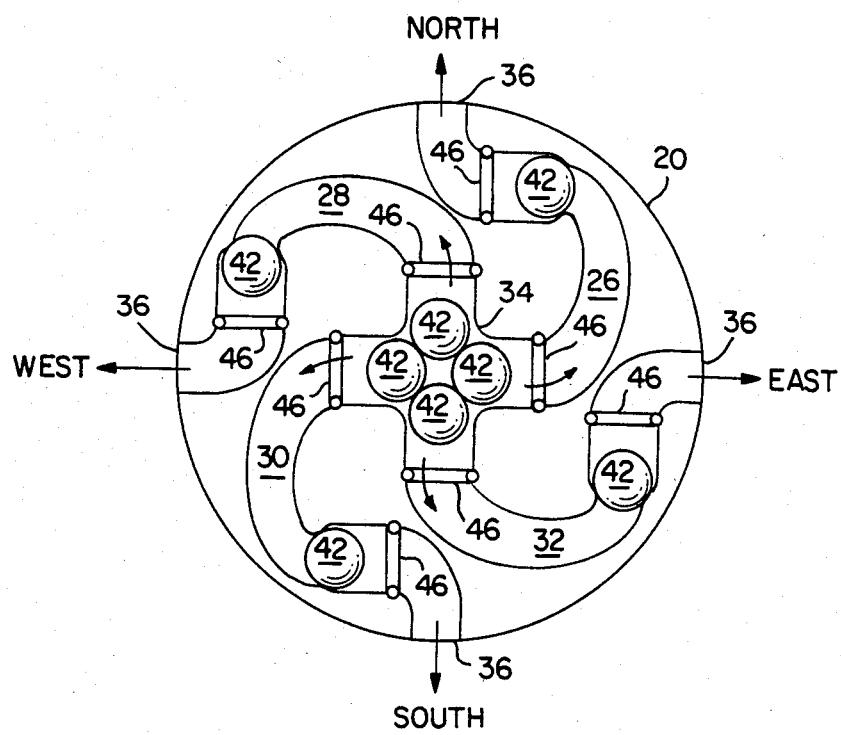
FIG. 3 is a diagrammatic plan view showing the arrangement of the channels of the erection system and the disposition of the balls in said channels when the gyro is erect.

With reference to FIGS. 2 and 3, the erection system of the invention is shown as including four curved channels 26, 28, 30 and 32 which are formed in base 20 and which extend, for purposes of illustration, in northerly, westerly, southerly and easterly directions, respectively (FIG. 3). In this regard, it will be understood that base 20 may be molded of a suitable plastic material.

With particular reference to FIG. 2, wherein channel 26 is shown for illustrative purposes, erection system 22 has a centrally disposed air inlet port 34 which communicates with air inlet ports 16 and 18 (FIG. 1), and each channel has an air outlet port such as 36.

With continued reference to FIG. 2, each channel such as 26, has a relatively shallow ramp 38, which may be, for example, at a slope of 0.5 degrees toward the center of the channel, and a relatively steep ramp 40, which may be, for example, at a slope of 10 degrees toward ramp 38.

With particular reference to FIG. 3, the erection system of the invention includes eight balls 42 (two balls per channel) free to roll along respective ramps 38 and 40 in channels 26, 28, 30, and 32. Eight gates 46, each one located at the end of a ramp (see FIG. 2), are used in conjunction with the balls to block air flow through the particular channel. In this regard, gates 46 may be molded of plastic or may be in the form of a conventional "O" ring as will be understood by those skilled in the art. Cover 22, which, by way of example, may be made of clear plastic, is contoured to trap each ball in its channel (FIG. 2).

With reference again to FIG. 1, spinning fan or turbine like device 14 sends an air stream through ports 16 and 18 and into the channels such as 26 via inlet port 34 (FIG. 2). As long as the spin axis of rotor 4 is vertical, balls 42 will remain in the position shown in FIGS. 2 and 3. This is typical for each channel 26, 28, 30 and 32. Thus, four air streams will flow through the four air channels in the four directions (north, south, east and west) and the air will exit the channels through ports 36. The air flow is shown by the arrows in FIG. 3. By virtue of the symmetry of the channels, the air stream will have the same magnitude so that the air flow through the channels is balanced and no torque will be applied to the spin axis of gyro rotor 4.

Figure 4:
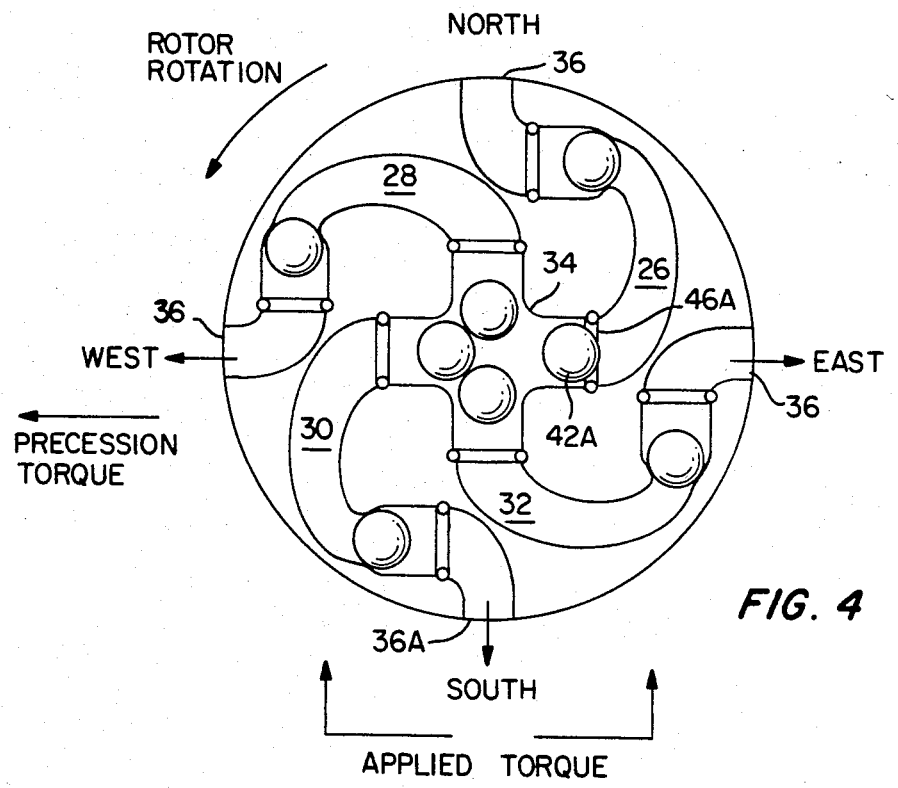
FIG. 4 is a diagrammatic plan view showing the arrangement of the channels of the erection system and the disposition of the balls in said channels when the gyro is tilted by more than a first predetermined angle but less than a second larger predetermined angle.

With reference to FIG. 4, if the spin axis of rotor 4 is tilted so that erection system base 20 is displaced, for example, to the right (clockwise in FIG. 2 or to the east in FIG. 3) by more than 0.5 degrees (the slope of ramp 38) but less than 10 degrees (the slope of ramp 40), ball 42A will roll up ramp 38 in its channel 26 to gate 46A and will block air flow through northerly extending channel 26. At that time, there is an unbalanced flow of air through erection system 22 due to the flow of air through southerly extending channel 30 via outlet port 36A, and a torque is applied to precess the gyro in a westerly direction and to thereby correct the easterly tilt which reestablishes the verticality of the rotor spin axis.

Figure 5:
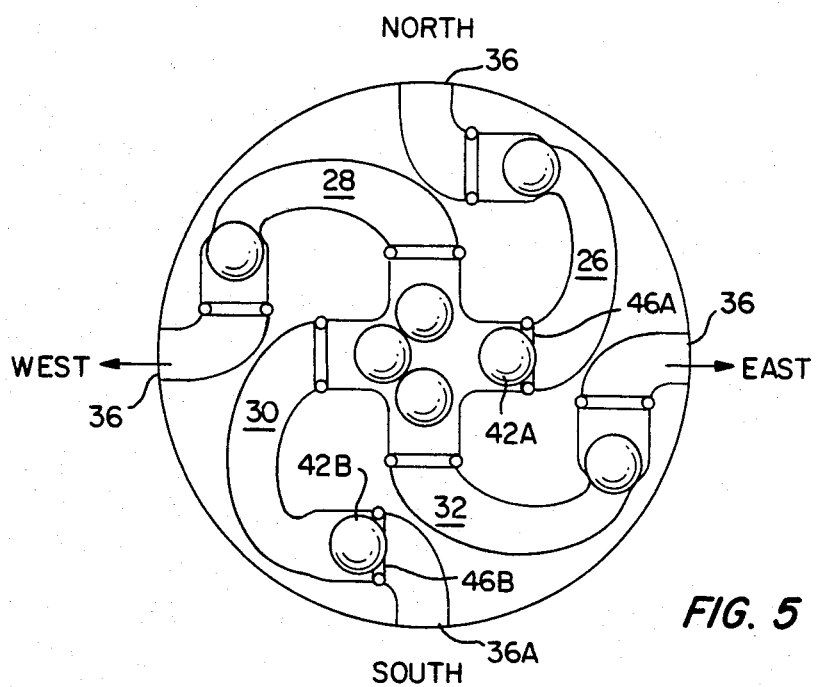
FIG. 5 is a diagrammatic plan view showing the arrangement of the channels and the disposition of the balls in said channels when the gyro is titled by more than the second predetermined angle.

With reference to FIG. 5, if the spin axis is tilted under the same conditions but more than the aforenoted 10 degrees, ball 42B will roll up ramp 40 in its channel 30 to gate 46B and block air flow through southerly extending channel 30. At that time, no air is flowing through either northerly extending channel 26 or southerly extending channel 30, the aforenoted unbalanced air flow through erection system 22 is negated, no torque is applied to the gyro, and the erection system is disabled. The disabling of the erection system may be made less than complete by arranging gates 46A or 46B, as the case may be, to have a small air leakage through the respective gate, as may be desired.

A similar situation will occur if the spin axis of rotor 4 is tilted so that erection system base 20 is displaced in other directions, whereby air flow through erection system 22 will be unbalanced to provide a torque to reestablish the verticality of the rotor spin axis, or the unbalanced air flow will be negated to disable the erection system.

Figure 6:
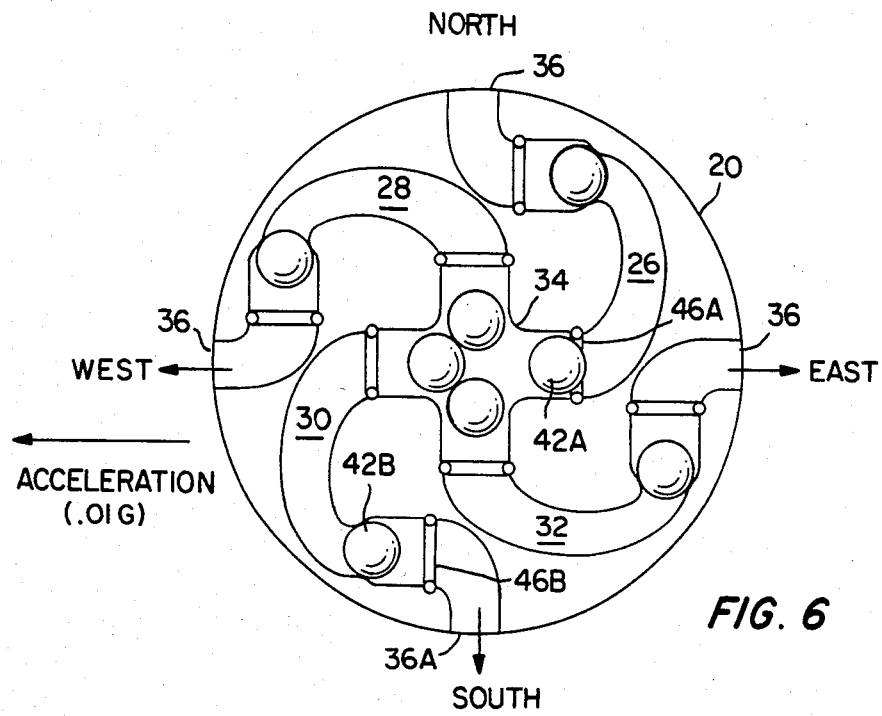
FIG. 6 is a diagrammatic plan view showing the arrangement of the channels and the disposition of the balls in said channels under conditions of slight acceleration.

Under acceleration conditions, effects similar to the heretofore described turning conditions will occur. Under slight accelerations, and with reference to FIG. 6, wherein a westerly acceleration is shown, ball 42A will roll up its ramp (FIG. 2) to gate 46A, blocking air flow through northerly extending channel 26. For example, if the ramp slope is the aforenoted 0.5 degrees, an acceleration of slightly greater than 1 "G" times the sine of 0.5 degrees or approximately 0.01 "G" ("G" being the acceleration due to gravity) will cause ball 42A to roll as described.

Figure 7:
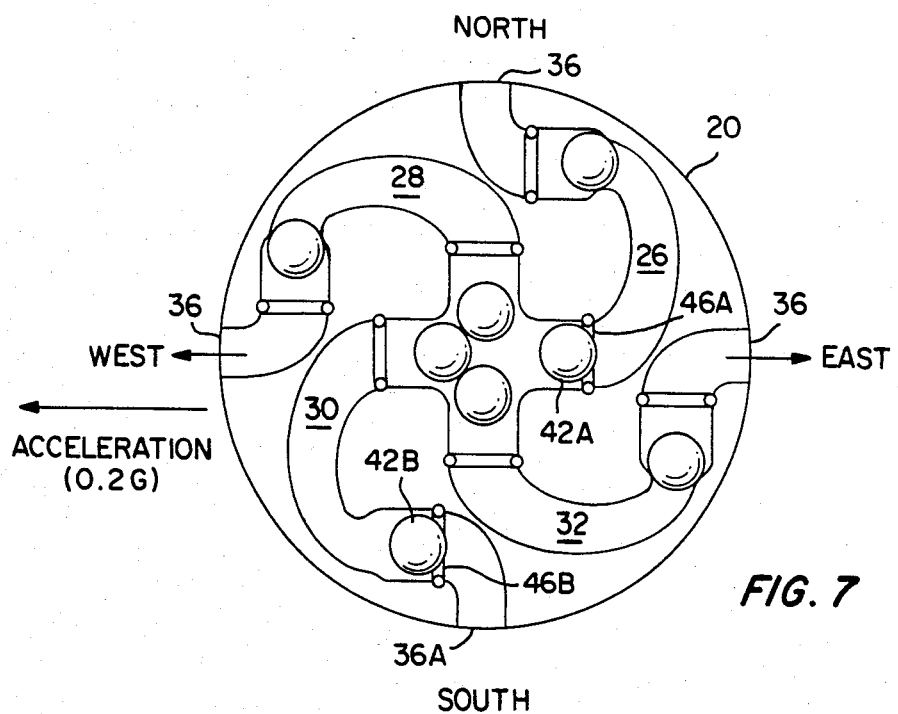
FIG. 7 is a diagrammatic plan view showing the arrangement of the channels and the disposition of the balls in said channels under conditions of heavier acceleration.

If the ramp slope is the aforenoted 10 degrees, ball 42B under the same westerly acceleration, will roll up its ramp 40 when the acceleration exceeds 1 "G" times the sine of 10 degrees or approximately 0.2 "G", blocking air flow through southerly extending channel 30 as shown in FIG. 7 to negate the unbalanced air flow and disable the erection system as aforenoted.

It will now be understood by those skilled in the art that the erection system described is not limited to the illustrated configuration, but the system may be reversed to provide similar results. For example, ramps 38 and 40 in FIG. 2 may slope away from the center of the channel and the gates may be at the opposite ends of the channel. Furthermore, while four channels have been shown for purposes of illustration, since three points define a plane surface a three channel design may be used with similar results. Reference is therefore to be had to the appended claims which define the scope of the invention.

What is claimed is:

1. For a gyro of the type having a spinning rotor and means spinning therewith for providing a flow of air, and erection system characterized by:

a plurality of channels, each of which extends in a different direction;

means associated with the gyro and the erection system for directing the flow of air through the channels;

air flow control means arranged with the channels and including a pair of balls disposed within each of the channels so as to roll therealong, each of the channels having a gate near an air inlet end and a gate near an air outlet end, the balls remaining stationary in the channels and away from the gates for permitting air to flow through the gates when the gyro is erect, whereby the flow of air through the erection system is balanced, one of the balls in a first of the channels rolling in said channel to the gate near the inlet end thereof and cooperating with said gate to prevent air from entering the channels and thereby blocking the flow of air through the first channel when the gyro is tilted from the erect by more than a first relatively small predetermined angle and less than a second relatively large predetermined angle, and one of the balls in a second of the channels rolling in said channel to the gate near the outlet end thereof and cooperating with said gate to prevent air from exiting the channel and thereby blocking the flow of air through the second channel when the gyro is tilted from the erect by more than the second angle.

2. A gyro erection system as described by claim 1, characterized by:

the first of the channels and the second of the channels extending in opposite directions.

3. A gyro erection system as described by claim 1, characterized by:
   each of the channels having a first ramp near its inlet end which slopes toward the center of the channel at the first angle and a second ramp near its outlet end which slopes toward the first ramp at the second angle;
   the one of the balls in the first of the channels rolling up the first ramp to the gate near the inlet end thereof when the gyro is tilted from the erect by more than the first relatively small predetermined angle and less than the second relatively large predetermined angle; and
   the one of the balls in the second of the channels rolling up the second ramp to the gate near the outlet end thereof when the gyro is tilted from the erect by more than the second angle.

4. An erection system as described by claim 1, further characterized by:
   the plurality of channels each of which extends in a different direction including four symmetrically curved channels extending in pairs in substantially opposite directions.

5. For a gyro of the type having a spinning rotor and means spinning therewith for providing a flow of air, an erection system characterized by:
   a base having a centrally disposed air inlet channel and plurality of channels formed in the base, each of which extends in a different direction and has an air inlet end communicating with the centrally disposed air inlet channel and an air outlet end;
   means associated with the gyro and the erection system for directing the flow of air through the channels;
   air flow control means arranged with the channels and effective for permitting air to flow through the channels when the gyro is erect, whereby the flow of air through the erection system is balanced and including balls arranged to roll in the channels for blocking the air inlet and outlet ends of the channels in accordance with the tilting of the gyro from the erect;
   a cover which fits over the base for maintaining the balls in the channels;
   the air flow control means being effective for blocking the flow of air through one of the channels when the gyro is tilted from the erect by more than a first relatively small predetermined angle and less than a second relatively large predetermined angle, whereupon the flow of air through the erection system is unbalanced, which provides a torque for erecting the gyro; and
   said air flow control means being effective for blocking the flow of air through another of the channels when the gyro is tilted from the erect by more than the second angle, with the unbalanced air flow being thereupon negated which renders the erection system disabled.

* * * * *